US010540974B2

(12) United States Patent
Pillai et al.

(10) Patent No.: US 10,540,974 B2
(45) Date of Patent: Jan. 21, 2020

(54) DETECTION AND DISPOSITION OF COMMANDS METHODS AND APPARATUSES

(71) Applicant: Intel Corporation, Santa Clara, CA (US)

(72) Inventors: Unnikrishnan G. Pillai, Bangalore KA (IN); Chetan Verma, Bangalore KA (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/992,977

(22) Filed: May 30, 2018

(65) Prior Publication Data

US 2019/0043498 A1 Feb. 7, 2019

(51) Int. Cl.
*G10L 15/04* (2013.01)
*G10L 15/22* (2006.01)
(Continued)

(52) U.S. Cl.
CPC .............. *G10L 15/22* (2013.01); *G10L 15/08* (2013.01); *G10L 15/24* (2013.01); *G10L 15/28* (2013.01);
(Continued)

(58) Field of Classification Search
CPC ... H04L 12/282; H04L 65/1069; G10L 15/22; G10L 15/32; G10L 2015/088; G10L 15/26; G10L 2015/228; G10L 13/00; G10L 15/1815; G10L 15/08; G10L 15/30; G10L 2015/223; G10L 25/00; G10L 15/02; G10L 15/06; G10L 15/142; G10L 15/144; G10L 15/1822; G10L 15/19; G10L 2015/227;
(Continued)

(56) References Cited

U.S. PATENT DOCUMENTS 7,283,954 B2 10/2007 Crockett et al.
7,698,008 B2 4/2010 Steinberg
(Continued)

OTHER PUBLICATIONS

Amr Alanwar et al, "EchoSafe: Sonar-based Verifiable Interaction with Intelligent Digital Agents", Nov. 5, 2017, 6 pages, SafeThings'17, Delft, Netherlands.

*Primary Examiner* — Huyen X Vo
(74) *Attorney, Agent, or Firm* — Schwabe, Williamson & Wyatt, P.C.

(57) ABSTRACT

Embodiments include apparatuses, systems, and methods for assisting in detection of user commands by virtual assistant devices. In embodiments, an apparatus for assisting or facilitating assistance to a user may include a first communication interface to receive an audio signal and a second communication interface to receive a modulated audio signal. In embodiments, a speech-recognition processor may be coupled to the first communication interface to detect a presence of a command in the audio signal. In embodiments, the command may include or be preceded by a keyword. In embodiments, a controller may be coupled to the second communication interface and the speech-recognition processor, to extract data from the modulated audio signal, and to dispose the detected command based at least in part on the data extracted on the modulated audio signal. Other embodiments may also be described and claimed.

13 Claims, 5 Drawing Sheets

(51) Int. Cl.
 *G10L 15/08* (2006.01)
 *G10L 15/28* (2013.01)
 *G10L 15/24* (2013.01)

(52) U.S. Cl.
 CPC .. *G10L 2015/088* (2013.01); *G10L 2015/223* (2013.01)

(58) Field of Classification Search
 CPC ..... G10L 21/0208; G10L 15/18; G10L 17/00; G06F 17/289
 See application file for complete search history.

(56) References Cited

U.S. PATENT DOCUMENTS

| | | |
|---|---|---|
| 9,460,201 B2 | 10/2016 | Anniballi |
| 9,536,546 B2 | 1/2017 | Motta et al. |
| 9,728,188 B1 | 8/2017 | Rosen et al. |
| 9,756,438 B2 | 9/2017 | Shayandeh et al. |
| 2009/0099836 A1* | 4/2009 | Jacobsen ............... G06F 17/289 704/3 |
| 2013/0183944 A1* | 7/2013 | Mozer ................... H04L 12/282 455/414.1 |
| 2014/0244267 A1* | 8/2014 | Levi ........................ G10L 15/22 704/275 |
| 2015/0104144 A1* | 4/2015 | Minemura .......... H04L 65/1069 386/230 |
| 2015/0287411 A1* | 10/2015 | Kojima ................... G10L 15/22 704/246 |
| 2016/0148616 A1* | 5/2016 | Takayanagi ............ G10L 15/32 704/235 |

* cited by examiner

DETECTION AND DISPOSITION OF COMMANDS METHODS AND APPARATUSES

FIELD

Embodiments of the present invention relate generally to the technical field of computing, and more particularly to detecting and disposition of a command or keyword, e.g., for a virtual assistant.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Virtual Assistant devices such as the AMAZON ECHO® and GOOGLE HOME® have become widely popular and can be found in many homes. Such Virtual Assistants typically are triggered by a keyword(s), spoken by the user. For example, for AMAZON ECHO® the keyword is "Alexa" and for the GOOGLE HOME®, the keyword is "OK Google." The use of a keyword or other triggering phrase or indication, however, also means that Virtual Assistants, can sometimes be mistakenly activated by a television (or radio, etc.) show or advertisement using the keyword. As a result, the Virtual Assistant can be susceptible to false triggering which can cause it to perform an unintended action. For example, various incidents have occurred due to erroneous detection of commands following keywords, ranging from inadvertent online purchases to the setting of internet of things (IoT) devices in users' homes. In some cases, the false triggering has deliberately been caused by advertisements or other media content played on the television or other electronic devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
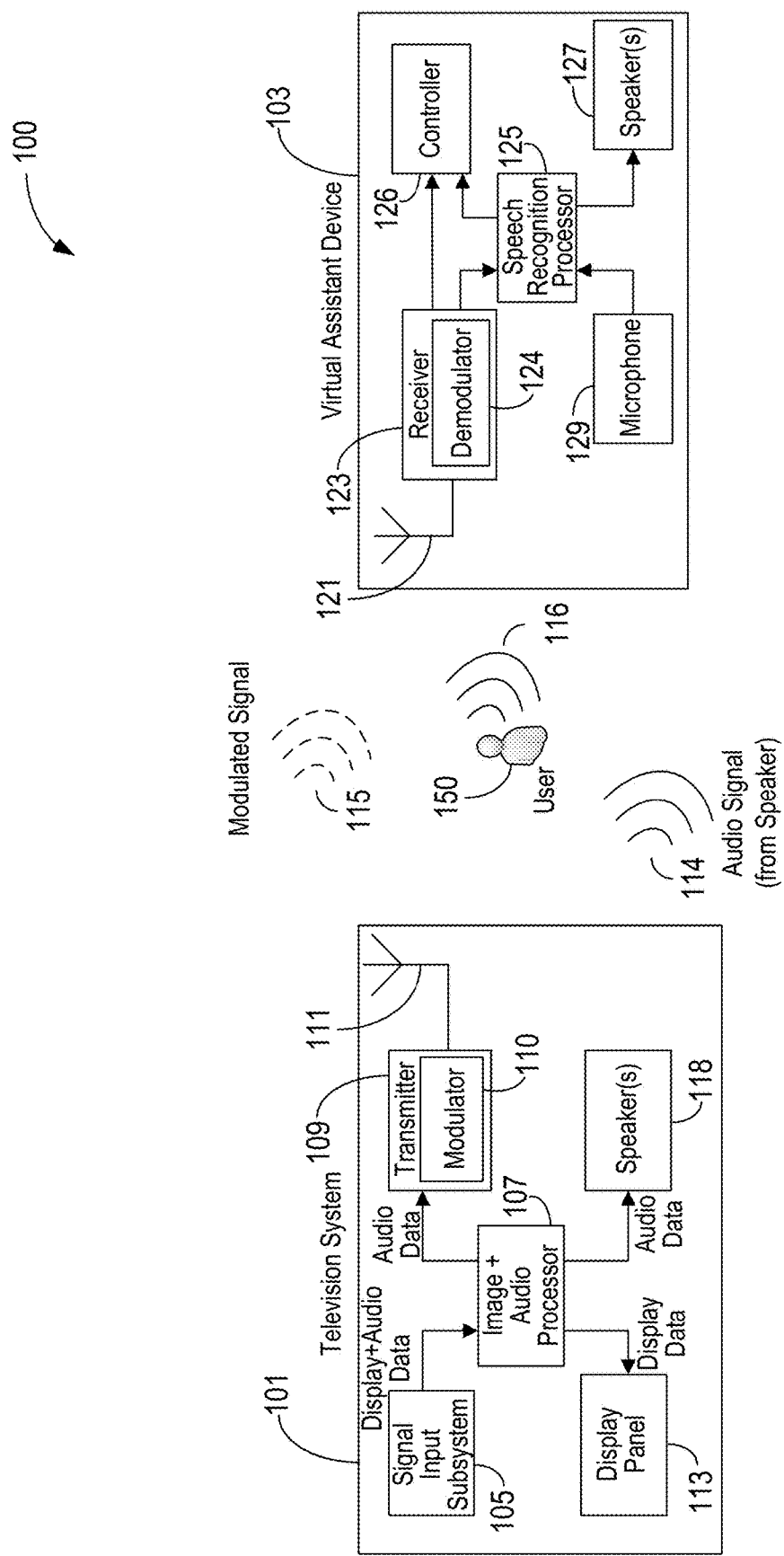
FIG. 1 is a block diagram including a virtual assistant device and an electronic device providing audio in an environment of a user in accordance with various embodiments

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Note also that "proximate" may mean near, on, over, under, attached, coupled to, nearby, surrounding, partially surrounding, or the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments described herein include apparatuses, systems, and methods, for assisting or facilitating assistance to a user. In embodiments, an electronic device, such as for example, a television system, may include an image and audio processor coupled to a transmitter and a speaker. In embodiments, the transmitter may include a modulator to modulate audio data onto a signal (e.g., a modulated signal that has been modulated outside of a human audible frequency range, also referred to as "non-audio signal" in various instances in the Description) for transmission to a virtual assistant device to assist the virtual assistant device in determining whether a source of a command is a user or the television system. Accordingly, in embodiments, a personal or virtual assistant device may include a first communication interface to receive an audio signal from an environment of the user and a second communication interface to receive the modulated signal. In some embodiments, the first communication interface may include a microphone and the second communication interface may include a receiver including a demodulator for the non-audio signal. In embodiments, a speech-recognition processor coupled to the first communication interface may detect a presence of a keyword or a command in the audio signal. In embodiments, a controller coupled to the second communication interface and the speech-recognition processor, may extract data from the modulated signal, and may dispose of the detected command based at least in part on the data extracted on the modulated signal.

FIG. 1 is a block diagram of an environment 100 including an electronic device, e.g., television system 101, and a personal or virtual assistant device 103 for assisting or facilitating assistance to a user 150. In the embodiment, as shown on the left side of block diagram 100, television system 101 may include a signal input subsystem 105, image and audio processor 107, display panel 113, speaker(s) 118, and a transmitter 109 including a modulator 110. In embodiments, transmitter 109 may be coupled to an emitter 111. In embodiments, emitter 111 may be an antenna e.g., such as for transmission of RF signals. In embodiments, modulator 110 may modulate audio data to be transmitted as a modulated signal 115 ("modulated signal 115") to be transmitted to virtual assistant device 103 to assist virtual assistant device 103 in determining whether a source of a command is user 150 or television system 101. In various embodiments, modulator 115 may modulate a signal onto a carrier that may be a selected one or more of a radiofrequency (RF), ultrasound (US), infrared (IR), visible light, or other suitable carrier. In some embodiments, modulator 115 may modulate a signal that was received from signal input system 105 as a closed-captioned signal. In embodiments, user 150 may provide speech audio 116 when speaking, such as, for example, making a command.

On the right side of block diagram 100, for the embodiment, virtual assistant device 103 may include a speech recognition processor 125, controller 126, speaker(s) 127, and a microphone 129. In embodiments, an antenna 121 may be coupled to a receiver 123 including a demodulator 124 of virtual assistant device 103. In embodiments, speaker(s) 118 may transmit an audio signal 114 (in a frequency within human hearing range) to environment 100 including user 150 and virtual assistant device 103. In embodiments, transmitter 109 may transmit a modulated signal 115 ("modulated signal 115") to be received by virtual assistant device 103. Virtual assistant device 103 may also receive speech audio 116 from user 150 as well as other audio detected in the environment 100, in the embodiment.

Accordingly, in embodiments, television system 101 may be playing in a background of environment 100 of user 150. Accordingly, in embodiments, signal input subsystem 105 may receive input signals from various sources (e.g., high-definition multimedia interface (HDMI), S-video or Composite Video inputs, TV tuner, the internet, other external sources, and the like) and as indicated in FIG. 1, may provide display and audio data to image and audio processor 107. In embodiments, image and audio processor 107 may process the display and audio data and subsequently may send display data to display panel 113 and audio data to external audio outputs, such as e.g., headphone jack, optical out, RCA, and HDMI (not shown). Accordingly, in the embodiment, image and audio processor 107 may provide audio data to a first audio port to be provided to speaker(s) 118 to be transmitted as audio signal 114 to environment 100. In embodiments, image and audio processor 107 may also provide audio data to a second audio port to be provided to transmitter 109.

In embodiments, modulator 110 of transmitter 109 may modulate audio data to be transmitted as modulated signal 115 to assist virtual assistant device 103 in determining whether a source of a command is user 150 or television system 101. Accordingly, in embodiments, virtual assistant device 103 may include a first communication interface such as, e.g., microphone 129, to receive audio signal 114 from speaker 118 and a second communication interface such as, e.g., a receiver 123, to receive modulated signal 115 from RF/US transmitter 109. In embodiments, microphone 129 may detect audio signal 114 from television system 101 as well as speech audio 116. In embodiments, speech-recognition processor 125 may be coupled to microphone 129 to detect a presence of a command or a keyword by user 150 in speech audio 116.

In embodiments, receiver 123 of virtual assistant device 103, in embodiments, may thus receive modulated signal 115. In embodiments, modulated signal 115 may include, for example, a selected one of a radiofrequency (RF), infrared (IR), visible light, ultrasonic (US), or other suitable signal modulated outside of a human audible frequency range. In embodiments, controller 126 may be coupled to receiver 123 and speech-recognition processor 125. In embodiments, as noted above, speech-recognition processor 125 may detect a presence of a command or a keyword in audio_speech 116. Accordingly, in embodiments, controller 126 may extract data from modulated signal 115 to dispose the detected command based at least in part on the data extracted on modulated signal 115. In embodiments, controller 126 may assist virtual assistant device 103 in determining whether the source of a command is user 150 or television system 101.

Note that in the embodiment shown, television system 101 of FIG. 1 is only one example of an electronic device that may be contemplated for the various embodiments. In various embodiments, a radio, laptop, tablet, mobile phone, or any suitable electronic device that may be an electronic source of audio in an environment of user 150 that may include or be coupled to a similar transmitter 109 to assist virtual assistant device 103 may be contemplated.

Figure 2:
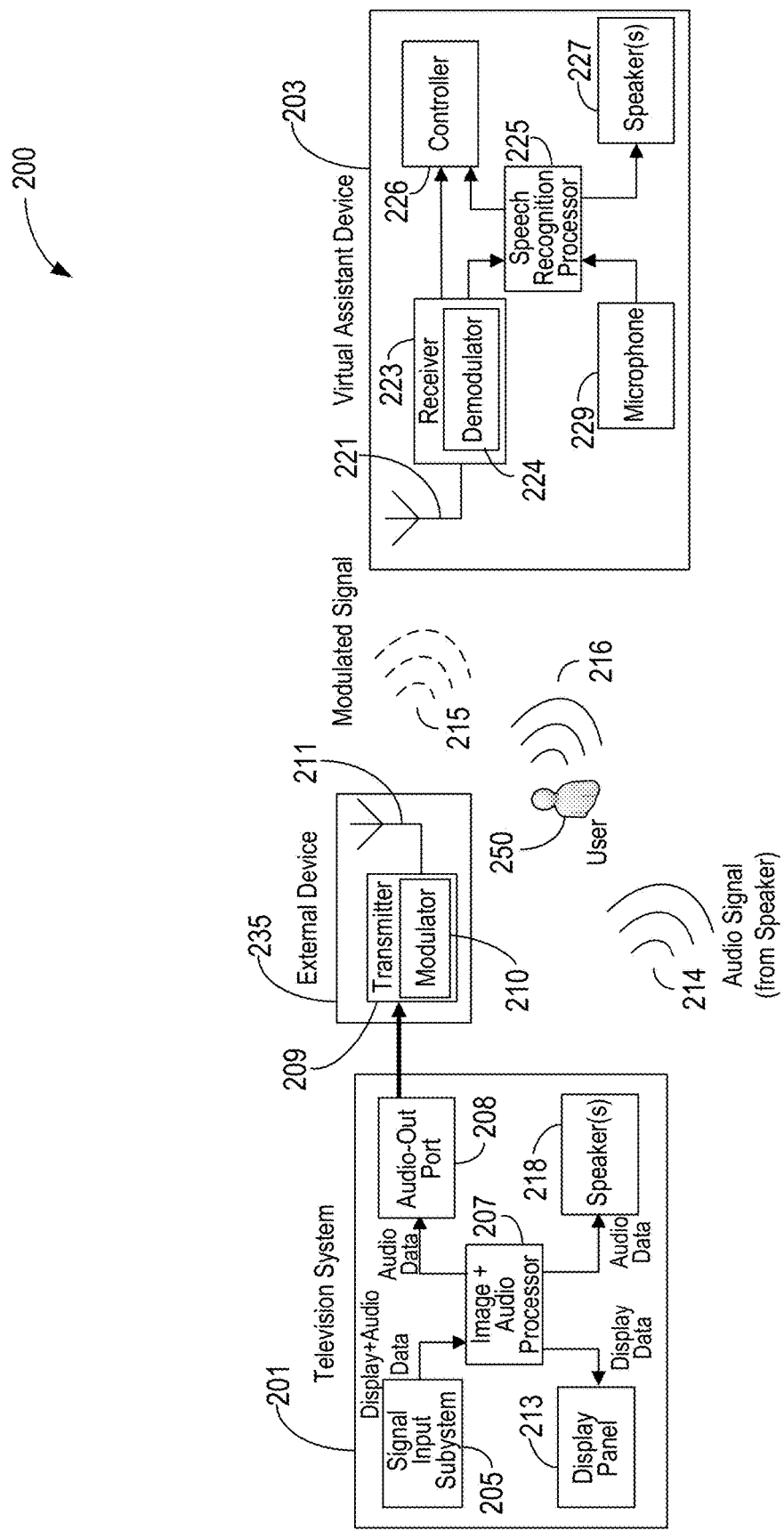
FIG. 2 is a block diagram including a virtual assistant device and an electronic device providing audio in an environment of a user in accordance with various additional embodiments.

Next, FIG. 2 is a block diagram of an environment 200 including an additional embodiment including an external device 235 to an electronic audio source or device e.g., television system 201. Accordingly, in embodiments, environment 200 includes television system 201 and a personal or virtual assistant device 203 for assisting or facilitating assistance to a user 250. In the embodiment, as shown on the left side of block diagram 200, television system 201 may include a signal input subsystem 205, image and audio processor 207, display panel 213, speaker(s) 218, and an audio-out port 208. On the right side of block diagram 200, for the embodiment, virtual assistant device 203 may include a speech recognition processor 225, controller 226, speaker(s) 227, and a microphone 229. In embodiments, an antenna 221 may be coupled to a receiver 223 including a demodulator 224 of virtual assistant device 203.

In embodiments, television system 201 may be a source of audio in environment 200 of user 250. Accordingly, in embodiments, signal input subsystem 205 may receive input signals from various sources (e.g., high-definition multimedia interface (HDMI), S-video or Composite Video inputs, TV tuner, the Internet, and the like) and may provide display and audio data to image and audio processor 207. In embodiments, image and audio processor 207 may process the display and audio data and subsequently may send display data to display panel 213 and audio data to external audio outputs, such as e.g., headphone jack, optical out, RCA, and HDMI (not shown). Accordingly, in the embodiment, image and audio processor 207 may provide audio data to an audio port to be provided to speaker(s) 218 to be transmitted as an audio signal 214 to environment 200 including user 250 and virtual assistant device 203.

Accordingly, a transmitter 209 including a modulator 210 may be included in an external device 235 to television system 101. In embodiments, transmitter 209 may be an external dongle or other external device that may be coupled to audio out port 208. In embodiments, transmitter 209 may be coupled to an emitter 211. Modulator 110 may include one or more of a radiofrequency (RF), ultrasound (US) transmitter, infrared (IR), visible light, or other modulator to modulate an audio signal to transmitted and received by virtual assistance device 203. Accordingly, in embodiments, transmitter 209 may transmit audio data as a modulated signal 215 to virtual assistant device 203 to assist virtual assistant device 203 in determining whether a source of a command is user 250 or television system 201. In embodiments, transmitter 209 may include an audio-in port to receive audio data from television system 201.

Accordingly, in embodiments, virtual assistant device 203 may include a first communication interface such as, e.g., microphone 229, to receive an audio signal 214 and a second communication interface such as, e.g., receiver 223 including modulator 224, to receive and demodulate a modulated signal 215. In embodiments, microphone 229 may detect audio detected in environment 100 such as audio signal 214 from television system 201 as well as audio signal or audio speech 216 that may come from user 250. In embodiments, speech-recognition processor 225 may be coupled to microphone 229 to detect a presence of a command or a keyword in audio speech 216.

In embodiments, demodulator 224 of virtual assistant device 203, may thus receive a modulated signal 215. In embodiments, modulated signal 215 may include, for example, a selected one of a radiofrequency (RF), infrared (IR), or ultrasonic (US) signal modulated outside of a human audible frequency range. In embodiments, controller 226 may be coupled to receiver 223 and speech-recognition processor 225. In embodiments, as noted above, speech-recognition processor 225 may detect a presence of a command or a keyword in audio signal 214. Accordingly, in embodiments, controller 226 may extract data from modulated signal 215 to dispose the detected command based at least in part on the data extracted on modulated signal 215. In embodiments, controller 226 may assist virtual assistant device 203 in determining whether the source of a command is user 250 or television system 201.

Note that as described above, emitter 111 or 211 of corresponding FIGS. 1 and 2 may be an antenna, such as for example, when transmitting RF signals. In other embodiments, note that emitter 111 or 211 may be a speaker when transmitting ultrasound, or a light emitting diode (LED), when transmitting visible or IR light. Accordingly, antenna 121 or 221 of corresponding FIGS. 1 and 2 may be, in various embodiments, a photoelectric or optical sensor, ultrasonic receiver, microphone, or other suitable receiver for the modulated signal.

Figure 3:
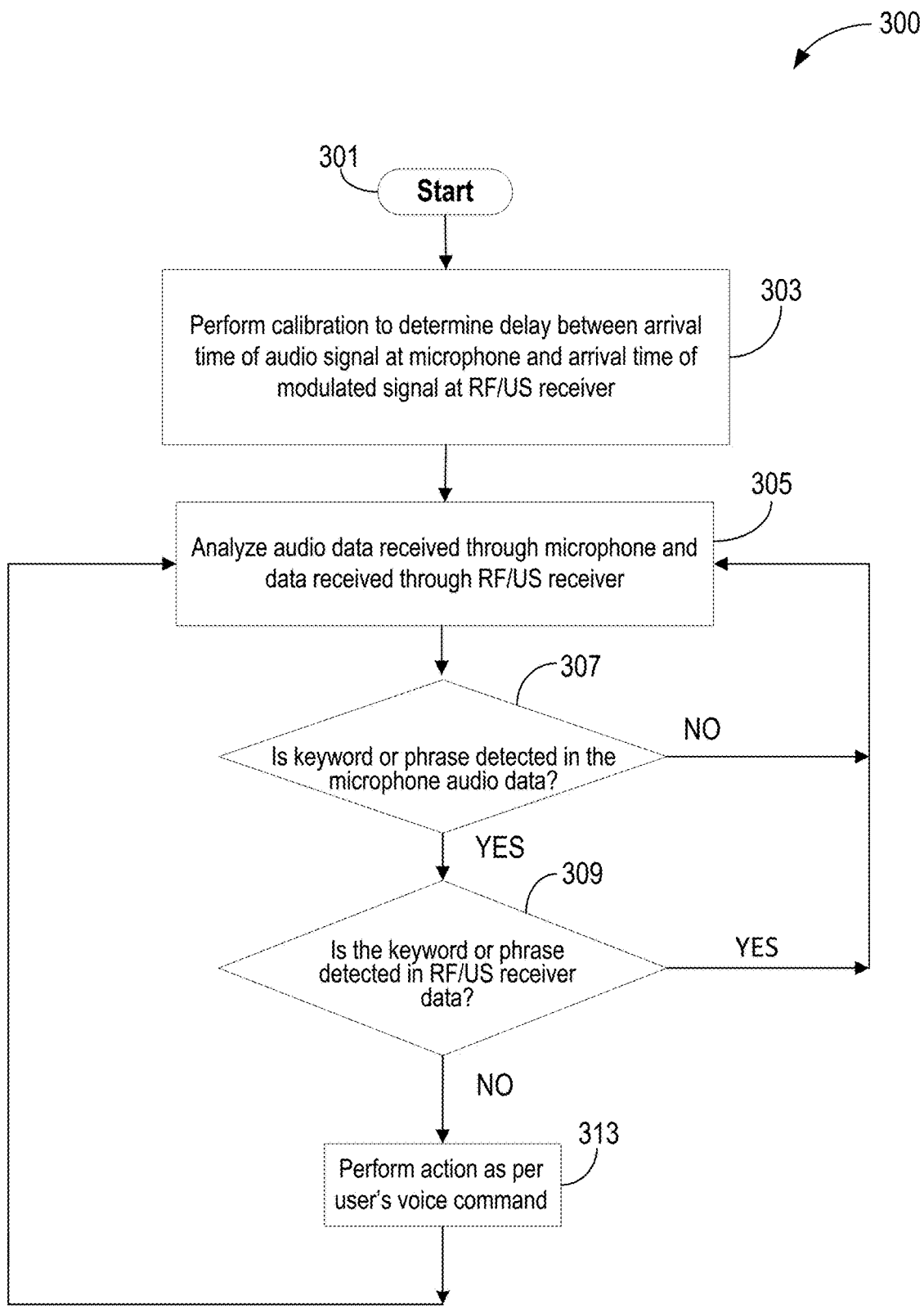
FIG. 3 is a flow diagram 300 illustrating in further detail, embodiments associated with the embodiments of FIGS. 1 and 2.

FIG. 3 is a flow diagram 300 illustrating a method associated with the embodiments of FIGS. 1 and 2 in various embodiments. In embodiments, a processor (e.g., speech recognition processor 125/225) may detect a presence of a command by detecting a keyword that occurs prior to the command in an audio signal received at a first communication interface (e.g., microphone 129/229). Based on the detection, in embodiments, the processor or a controller (e.g., controller 126) may dispose of the detected command based at least in part on the keyword also being present in a modulated audio signal or modulated signal received at a second communication interface (e.g., receiver 123/223). In embodiments, the processor may dispose of the detected command by instructing a virtual assistant device (e.g., virtual assistant device 103/203) to ignore or respond to the detected command.

Accordingly, method 300 may begin at a start block 301. In embodiments, there may be a time delay between arrival of a direct audio signal ("audio signal") received at the microphone and arrival of a modulated signal ("modulated signal") at the receiver. Accordingly, in embodiments, at a block 303, the processor may perform a calibration to determine a delay time between arrival of the audio signal and arrival of the modulated signal. In embodiments, the processor may perform the calibration to calibrate an analysis of data extracted from the modulated signal. Thus at a next block 305, in the embodiment, the processor may analyze audio data received through the microphone and audio data received through the receiver. At a decision block 307, in embodiments, the processor may check for a keyword, e.g. OK Google®, (or other trigger or phrase) in the audio data from the microphone. If the keyword is not detected, the answer is NO and the method may returns to block 305 so that the processor may continue to analyze the audio data received through the microphone and audio data received through the receiver. Once the keyword is detected, in embodiments, however, the answer at decision block 307 is YES, and the method flows to next block 309. In embodiments, at block 309, the processor may check to determine if the keyword or phrase is detected in audio data from the receiver. If the answer is NO, in embodiments, the method may move downward to block 313 where the virtual assistant may perform an action per a user's voice command. Afterwards, in embodiments, method 300 may return to block 305 so that the processor may continue to analyze incoming audio data for another occurrence of the keyword.

Figure 4:
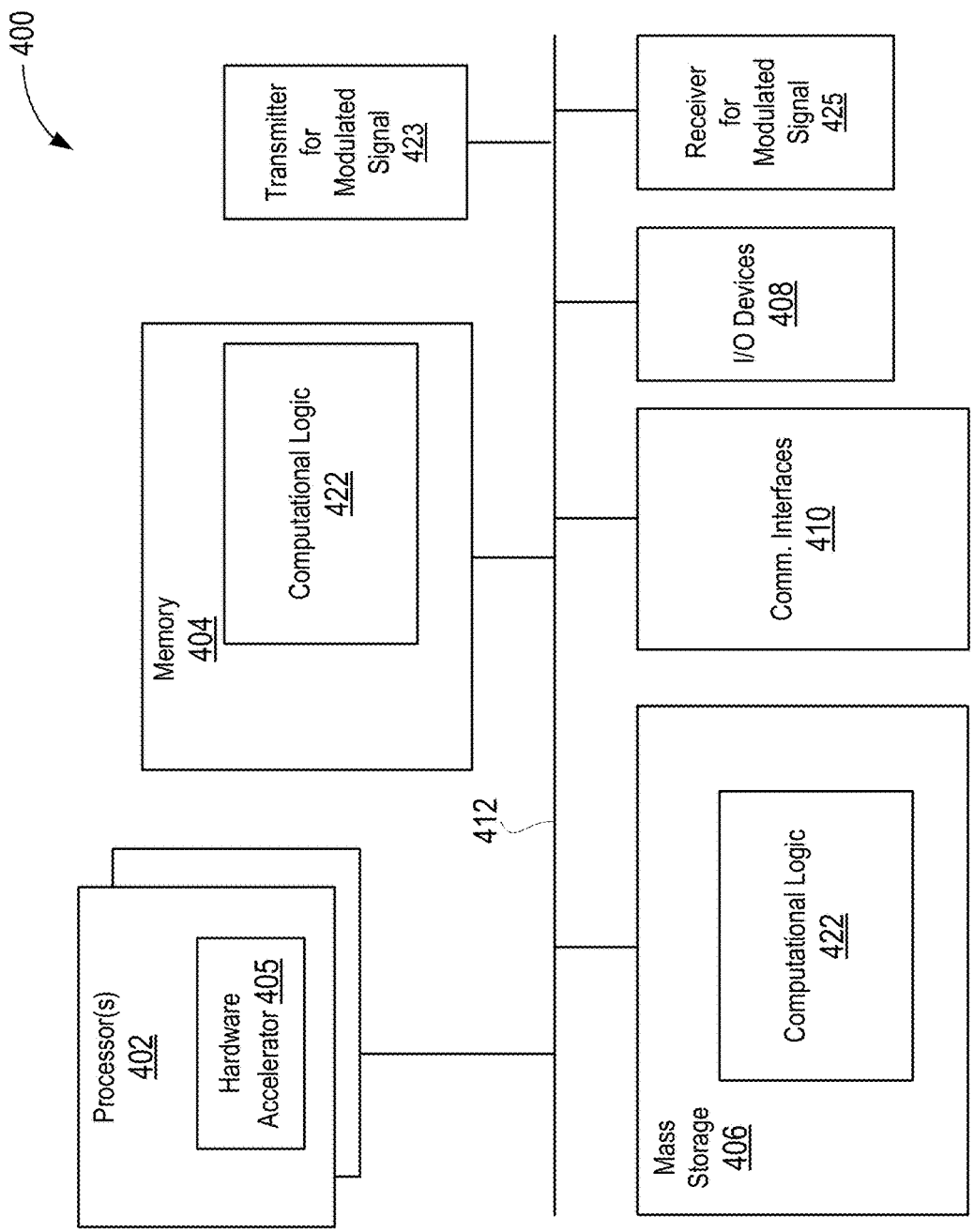
FIG. 4 illustrates an example system 400 in accordance with various embodiments.

If, however, the keyword or phrase is detected in audio data from the receiver, and the answer at decision block 309 is YES, in embodiments. An answer of YES may indicate that the source of the keyword is, e.g., television system 101/201, rather than a user, in embodiments. Accordingly, the keyword and/or command can be ignored and the method may return to block 305, so that the processor may continue to analyze incoming audio data. In embodiments, the loop may begin again, as the processor may continue to analyze incoming audio data for another occurrence of the keyword FIG. 4 illustrates an example computing device 400 that may be suitable for use to practice selected aspects of the present disclosure. In embodiments, computing device 400 may be included in a virtual assistant device or an electronic device that may play audio (e.g., television system 101 or other audio source, e.g., laptop, tablet, mobile phone, or any suitable electronic device that may play media and/or associated audio in an environment of a user as described above with respect to FIGS. 1-3). In some embodiments, computing device 400 may be external device 235 of FIG. 2. Note that, computing device 400 may in some embodiments, include both the virtual assistant device and the electronic device. For example, in embodiments, an onboard computer of an automobile may include or be coupled to both the virtual assistant device and an electronic device that is an audio source (e.g., radio or other media player). Accordingly, in alternate embodiments, an audio signal from the electronic device may be transmitted to the virtual assistant device via a connector or cable rather than an emitter. Note, furthermore, that additional elements of computing device 400 may be included and/or conversely, one or more elements of computing device 400 may be omitted depending upon the embodiment.

In the illustrated embodiment, computing device 400 may include one or more processors or processor cores 402, and a memory 404. For the purpose of this application, including the claims, the term "processor" refers to a physical processor, and the terms "processor" and "processor cores" may be considered synonymous, unless the context clearly requires otherwise. Accordingly, processors 402 may include, e.g., speech recognition processor 225 of FIG. 2. Additionally, computing device 400 may include mass storage devices 406 (such as diskette, hard drive, compact disc read only memory (CD-ROM) and so forth), communication interfaces 410 (such as network interface cards, modems, infrared receivers, radio receivers (e.g., Bluetooth), and so forth). The elements may be coupled to each other via system bus 412, which may represent one or more buses. In the case of multiple buses, they may be bridged by one or more bus bridges (not shown).

In embodiments, communication interfaces 410 may include one or more communications chips and may enable wired and/or wireless communications for the transfer of data to and from the computing device 400. In some embodiments, communication interfaces 410 may include a transceiver including a transmitter and receiver or a communications chip including the transceiver. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 410 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 410 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others.

In embodiments, a transmitter for a modulated signal 423 and receiver for a modulated signal 425 may be coupled to bus 412 to perform functions associated with the apparatuses and methods of transmitter 109/209 and receiver 123/223 of FIGS. 1-3. Note that FIG. 4 illustrates transmitter 109/209 and receiver 123/223 as coupled to the same bus 412, in various embodiments, only one of transmitter or receiver 123/223 may be coupled to bus 412 when included in different devices, e.g., television set 101 and virtual assistant device 103. In embodiments, transmitter 423 and receiver 425 may be included in communication interfaces 410 as described above or may be provided in addition to communication interfaces 410 to perform functions associated exclusively with the functions described in connection with transmitter 109/209 and receiver 123/223 of FIGS. 1-3.

Each of these elements described above may perform its conventional functions known in the art. In particular, computing device 400 may be employed to store and host execution of programming instructions implementing the operations associated with capturing and receiving an audio signal, receiving a modulated audio signal, detecting a presence of a command in the audio signal; and extracting data from the modulated audio signal, and disposing the detected command based at least in part on the data extracted on the modulated audio signal, as described in connection with FIGS. 1-3. In embodiments, the programming instructions may implement the operations associated with causing equivalent RF/US or other suitable signals to be modulated/transmitted and/or received for an audio signal.

In embodiments, the aforementioned programming instructions may be collectively referred to as computational logic 422 that provides the capability of the embodiments described in the current disclosure. The various elements may be implemented by assembler instructions supported by processor(s) 402 or high-level languages, such as, for example, C, that can be compiled into such instructions. Operations associated with controlling a power consumption based on power information for an application to be operated on the one or more processors not implemented in software may be implemented in hardware, e.g., via hardware accelerator 405. Aspect of operations associated with controlling drive elements or determining a service provider assignment not implemented in software, as described in connection with FIGS. 1-4, may be implemented in the hardware accelerator.

The number, capability and/or capacity of these elements 402-422 may vary, depending on the number of other devices the computing device 400 is configured to support. Otherwise, the constitutions of elements 402-422 are known, and accordingly will not be further described.

As will be appreciated by one skilled in the art, the present disclosure may be embodied as methods or computer program products. Accordingly, the present disclosure, in addition to being embodied in hardware as earlier described, may take at least partial form of a software embodiment (including firmware, resident software, micro-code, etc.) or an embodiment combining software and hardware aspects that may all generally be referred to as a "circuit," "module," or "system."

Figure 5:
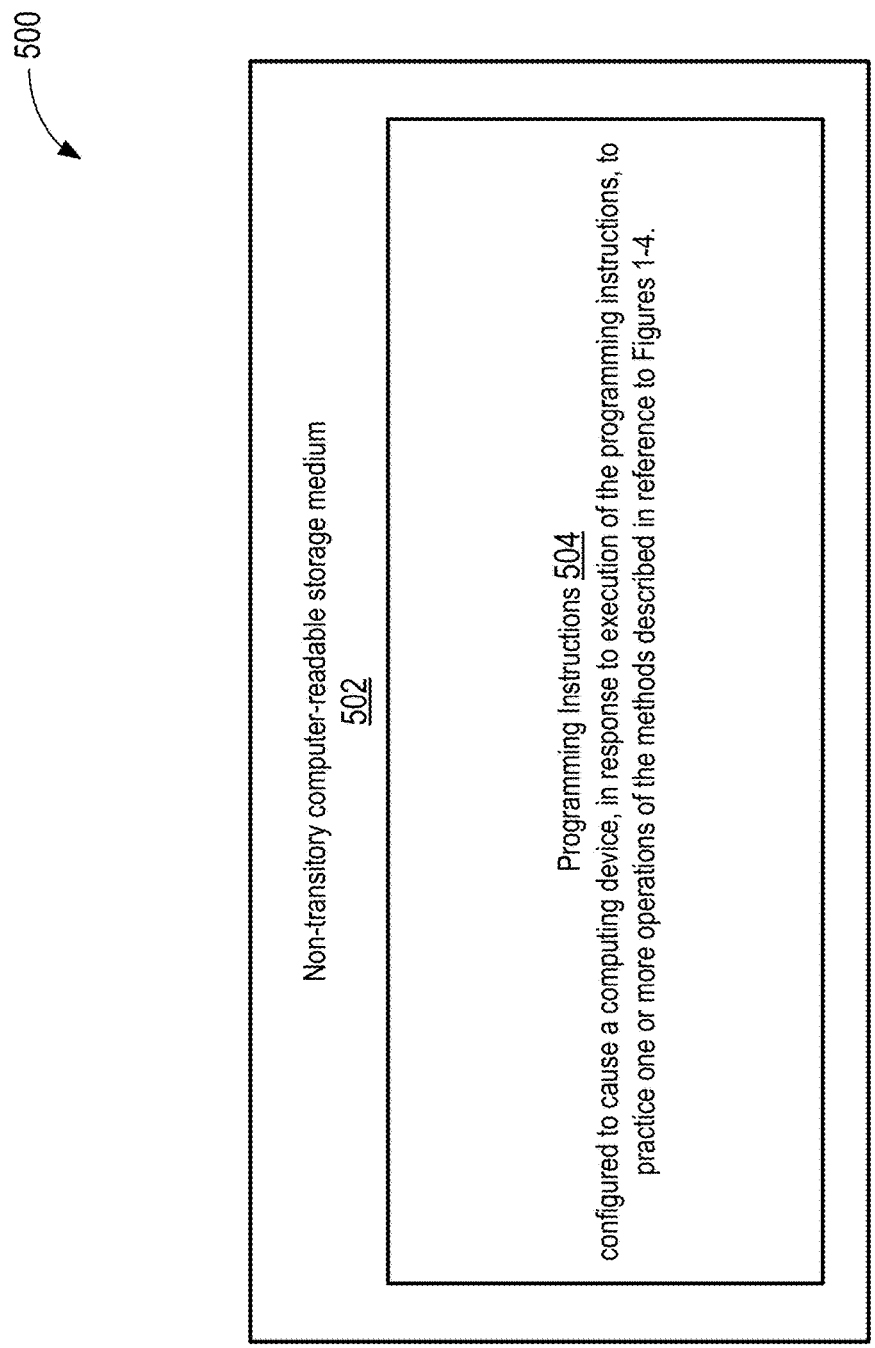
FIG. 5 illustrates a storage medium 500 having instructions for practicing methods described with references to FIGS. 1-4, in accordance with various embodiments.

Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 502 may include a number of programming instructions 504. Programming instructions 504 may be configured to enable a device, e.g., virtual assistant device 103/203 or an electronic device, e.g., television system 101/201, or external device 235, in response to execution of the programming instructions to perform, e.g., various operations as discussed in FIGS. 1-4.

In alternate embodiments, programming instructions 504 may be disposed on multiple computer-readable non-transitory storage media 502 instead. In alternate embodiments, programming instructions 504 may be disposed on computer-readable transitory storage media 502, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some non-limiting Examples are provided below.

Example 1 may include an apparatus for assisting or facilitating assistance to a user including a first communication interface to receive an audio signal; a second communication interface to receive a non-audio signal; a speech-recognition processor coupled to the first communication interface to detect a presence of a command in the audio signal; and a controller coupled to the second communication interface and the speech-recognition processor, to extract data from the non-audio signal, and to dispose the detected command based at least in part on the data extracted on the non-audio signal.

Example 2 may include the apparatus of Example 1, wherein the audio signal includes audio from an electronic device in an environment of the user and speech from the user.

Example 3 may include the apparatus of Example 1, wherein the non-audio signal is a selected one of a radiofrequency (RF), infrared (IR), or ultrasonic (US) signal modulated outside of a human audible frequency range and/or includes a closed-captioned signal modulated onto a signal outside of a human audible frequency range.

Example 4 may include the apparatus of Example 1, wherein the first communication interface is a microphone and wherein the audio signal is detected by the microphone in an environment that includes the user and an electronic device including a television, radio, or other media device.

Example 5 may include the apparatus of Example 1, wherein the second communication interface is a radiofrequency (RF) Bluetooth or ultrasonic (US) receiver coupled to receive the non-audio signal and wherein the non-audio signal is received from an electronic device located in an environment of the user.

Example 6 may include the apparatus of Example 1, wherein the speech-recognition processor to detect a presence of a command by detecting a keyword that occurs prior to the command in the audio signal.

Example 7 may include the apparatus of Example 6, wherein the controller to dispose the detected command based at least in part on the keyword also being present in the non-audio signal.

Example 8 may include the apparatus of Example 6, wherein the apparatus is a personal assistant device and wherein the controller to dispose of the detected command includes to ignore the detected command.

Example 9 may include the apparatus of any one of Examples 1-8, wherein the apparatus is a personal assistant device and wherein the controller to dispose of the detected command includes to instruct the personal assistant device to respond to the detected command.

Example 10 may include the apparatus of any one of Examples 1-8, wherein the controller to determine a delay between an arrival of first data in the audio signal and second data in the non-audio signal to calibrate analysis of the data extracted from the non-audio signal.

Example 11 may include an apparatus, comprising an audio-in port; and a transmitter coupled to receive audio data from the audio in-port and to modulate and transmit the audio data as a modulated signal to a personal assistant device to assist the personal assistant device in determining whether a source of a command is a user or the apparatus.

Example 12 may include the apparatus of Example 11, wherein the transmitter includes a radiofrequency (RF), ultrasound (US) modulator, infrared (IR), or other suitable modulator to modulate the signal as a non-audible signal.

Example 13 may include the apparatus of Example 11 or 12, wherein the apparatus is a television set and further comprises a video and audio processor coupled to provide the audio data to the audio-in port to be received by the transmitter.

Example 14 may include the apparatus of Example 13, wherein the video and audio processor is further coupled to provide audio data to a speaker in the apparatus to be transmitted as an audio signal.

Example 15 may include the apparatus of Example 11, wherein the apparatus is a television system and further comprises a signal input subsystem, display panel, the transmitter, and a speaker.

Example 16 may include one or more computer-readable media (CRM) comprising instructions, which when executed by one or more processors of a computer device, is to cause the computer device to receive an audio signal; receive a non-audio signal; detect the presence of a command in the audio signal; and extract data from the non-audio signal, and to dispose the detected command based at least in part on the data extracted on the non-audio signal.

Example 17 may include the one or more CRM of Example 16, wherein the non-audio signal is a radiofrequency (RF), infrared (IR), or ultrasonic (US) signal modulated outside of a human audible frequency range.

Example 18 may include the one or more CRM of Example 16, wherein to cause the computer device to extract data from the non-audio signal includes to extract data to determine whether a keyword is included in the non-audio signal.

Example 19 may include the one or more CRM of Examples 16-18, further comprising instructions which when executed causes the computer device to determine an arrival time of first data in the audio signal and second data in the non-audio signal to calibrate a comparison of the first data in the audio signal and the second data in the non-audio signal.

Example 20 may include the one of more CRM of Example 16-19, wherein if the presence of the command is detected in the audio signal and data extracted from the non-audio signal indicates a presence of the command in the non-audio signal, the CRM to provide an instruction to a personal assistant device to ignore a command following a keyword.

Example 21 may include a method, comprising receiving audio data from an audio port; modulating the audio data to be transmitted as a non-audio signal; and transmitting the non-audio signal to a virtual assistant device for comparison of the non-audio signal to an audio signal to determine if a command or a keyword in the non-audio signal comes from a similar source as a command or a keyword in the audio signal.

Example 22 may include the method of Example 21, wherein the non-audio signal includes a radiofrequency (RF), infrared (IR), or ultrasonic (US) signal modulated outside of a human audible frequency range Example 23 may include the method of Example 21, wherein the audio signal includes words detected in an environment of a user.

Example 24 may include any one of the methods of Examples 21-23, wherein the similar source is either a user or an electronic device in the environment of the user and based on the determination, the virtual assistant device to determine if a command or a question is to be responded to by the personal assistant device.

Example 25 may include the method of Example 24, wherein the command or a question is to be ignored by the personal assistant device if data extracted from the non-audio signal indicates a same keyword is present in the audio signal and the non-audio signal.

Example 26 may include an apparatus, comprising: means for receiving audio data from an audio port; means for modulating the audio data to be transmitted as a non-audio signal; and means for transmitting the non-audio signal to a virtual assistant device for comparison of the non-audio signal to an audio signal to determine if a command or a keyword in the non-audio signal comes from a similar source as a command or a keyword in the audio signal.

Example 27 may include the apparatus of Example 26, wherein the means for modulating the audio data includes means for modulating an audio signal onto a radiofrequency (RF), infrared (IR) light, visible light, or ultrasonic (US) signal.

Example 28 may include the apparatus of Example 26, further comprising means for receiving video and audio data from an external source and providing the audio data to the audio port.

Although certain embodiments have been illustrated and described herein for purposes of description, this application is intended to cover any adaptations or variations of the embodiments discussed herein. Therefore, it is manifestly intended that embodiments described herein be limited only by the claims. Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

As noted previously, the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Although certain embodiments have been illustrated and described herein for purposes of description, this application is intended to cover any adaptations or variations of the embodiments discussed herein. Therefore, it is manifestly intended that embodiments described herein be limited only by the claims. Where the disclosure recites "an" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An apparatus for assisting or facilitating assistance to a user, comprising:
    a first communication interface to receive an audio signal;
    a second communication interface to receive a non-audio signal;
    a speech-recognition processor coupled to the first communication interface to detect a presence of a command in the audio signal by detecting a keyword that occurs prior to the command in the audio signal; and
    a controller coupled to the second communication interface and the speech-recognition processor, to extract data from the non-audio signal, and to dispose the detected command based at least in part on the keyword also being present in the data extracted on the non-audio signal, wherein the controller is coupled to provide an instruction related to the detected command via a communications network coupled to a personal assistant device.

2. The apparatus of claim 1, wherein the audio signal includes audio from an electronic device in an environment of the user and speech from the user.

3. The apparatus of claim 1, wherein the non-audio signal is a selected one of a radiofrequency (RF), infrared (IR), visible light, or ultrasonic (US) signal modulated outside of a human audible frequency range and/or includes a closed-captioned signal modulated onto a signal outside of a human audible frequency range.

4. The apparatus of claim 1, wherein the first communication interface is a microphone and wherein the audio signal is detected by the microphone in an environment that includes the user and an electronic device including a television, radio, or other media device.

5. The apparatus of claim 1, wherein the second communication interface is a radiofrequency (RF) Bluetooth or ultrasonic (US) receiver coupled to receive the non-audio signal and wherein the non-audio signal is received from an electronic device located in an environment of the user.

6. The apparatus of claim 1, wherein the apparatus is the personal assistant device and wherein the controller to dispose of the detected command includes to ignore the detected command.

7. The apparatus of claim 1, wherein the apparatus is the personal assistant device and wherein the controller to dispose of the detected command includes to instruct the personal assistant device to respond to the detected command.

8. The apparatus of claim 1, wherein the controller is to determine a delay between an arrival of first data in the audio signal and second data in the non-audio signal to calibrate analysis of the data extracted from the non-audio signal.

9. One or more non-transitory computer-readable media (CRM) comprising instructions, which when executed by one or more processors of a computer device, are to cause the computer device to:
    receive an audio signal;
    receive a non-audio signal;
    detect the presence of a command in the audio signal by detecting a keyword that occurs prior to the command in the audio signal; and
    extract data from the non-audio signal, and to dispose the detected command based at least in part on the data extracted on the non-audio signal, wherein the CRM is to provide an instruction via a communications network to dispose the command based at least in part on the keyword also being present in the non-audio signal.

10. The one or more CRM of claim 9, wherein the non-audio signal is a radiofrequency (RF), infrared (IR), or ultrasonic (US) signal modulated outside of a human audible frequency range.

11. The one or more CRM of claim 9, wherein to cause the computer device to extract data from the non-audio signal includes to extract data to determine whether a keyword is included in the non-audio signal.

12. The one or more CRM of claim 9, further comprising instructions which when executed causes the computer device to determine an arrival time of first data in the audio signal and second data in the non-audio signal to calibrate a comparison of the first data in the audio signal and the second data in the non-audio signal.

13. The one of more CRM of claim 9, wherein if the presence of the command is detected in the audio signal and data extracted from the non-audio signal indicates a presence of the command in the non-audio signal, the CRM is to provide an instruction to a personal assistant device to ignore a command following a keyword.

* * * * *